May 1, 1945.  G. H. MIDDLETON  2,374,691
ANIMAL TRAP
Filed March 15, 1943  3 Sheets-Sheet 1

Inventor
Gordon H. Middleton
By Clarence A. O'Brien
and Harvey B. Jacobson
Attorneys May 1, 1945.  G. H. MIDDLETON  2,374,691
ANIMAL TRAP
Filed March 15, 1943   3 Sheets-Sheet 2

Inventor
Gordon H. Middleton

May 1, 1945.  G. H. MIDDLETON  2,374,691
ANIMAL TRAP
Filed March 15, 1943   3 Sheets-Sheet 3
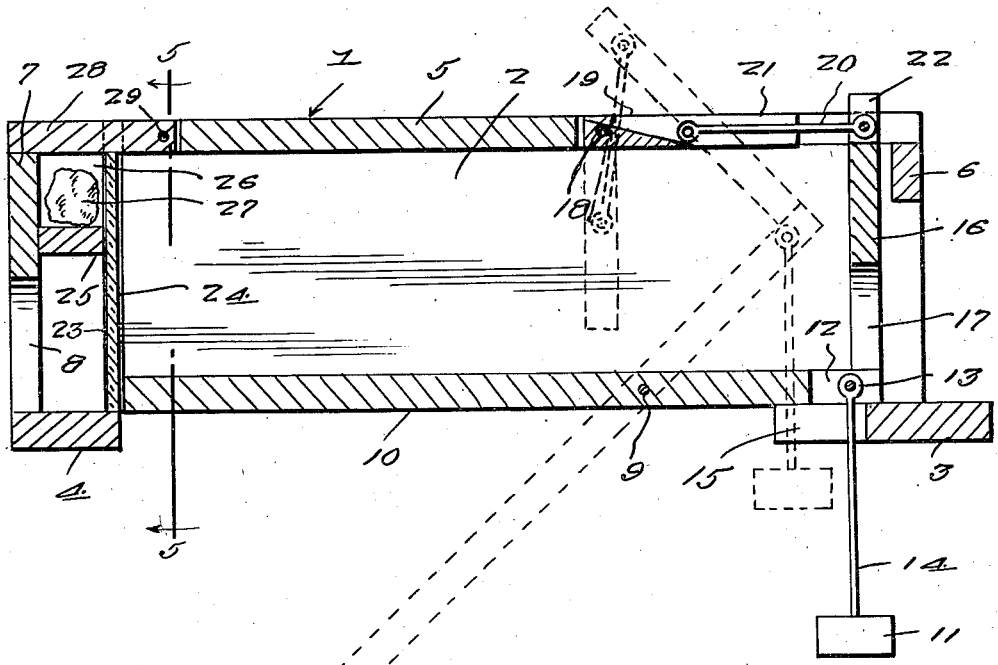
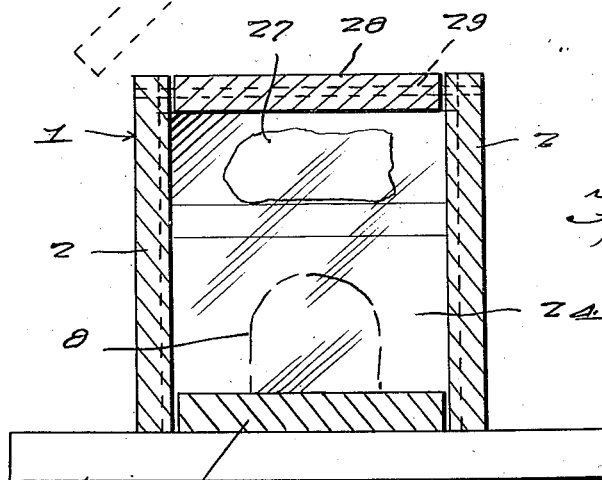
Inventor
Gordon H. Middleton
By Clarence A. O'Brien
and Harvey B. Jacobson
Attorneys Patented May 1, 1945

2,374,691

UNITED STATES PATENT OFFICE 2,374,691

ANIMAL TRAP

Gordon H. Middleton, Superior, Ariz., assignor of one-half to Howard J. Ohl, Superior, Ariz.

Application March 15, 1943, Serial No. 479,275

2 Claims. (Cl. 43—69)

The present invention relates to new and useful improvements in animal traps, particularly for rats, mice, et cetera, and has for its primary object to provide, in a manner as hereinafter set forth, a device of this character which is adapted to destroy the animals as they are caught by drowning.

Another very important object of the invention is to provide, in a trap of the aforementioned character comprising a self-resetting, animal-actuated, tiltable platform, novel means for positively preventing the animal from escaping after it has once entered the trap and tilted the platform.

Other objects of the invention are to provide an animal trap of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a top plan view of the trap.

Figure 3 is an end elevational view.

Figure 4 is a view in vertical longitudinal section through the trap.

Figure 5 is a cross sectional view, taken substantially on the line 5—5 of Figure 4.

Figure 1:
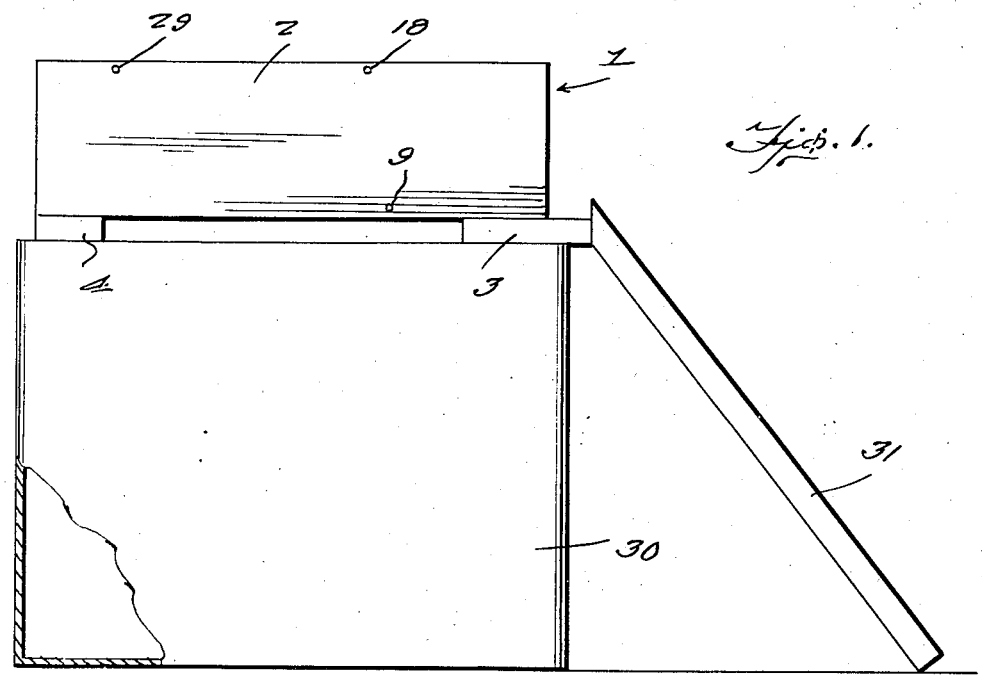
Figure 1 is a view in side elevation, showing a trap constructed in accordance with the present invention in position on top of a water container, a portion of the latter being broken away in vertical section.
Figure 6:
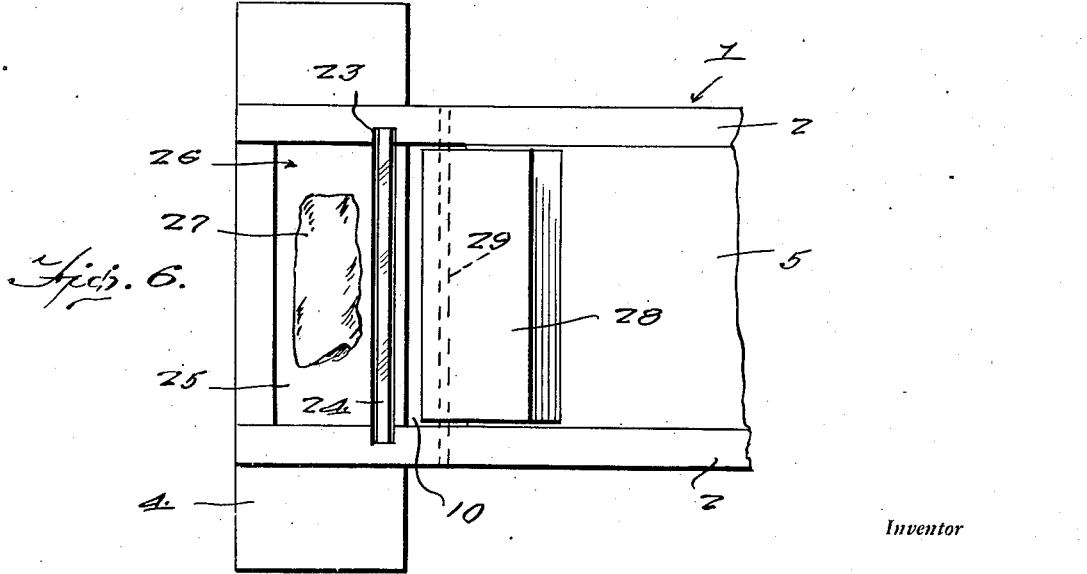
Figure 6 is a top plan view of an end portion of the trap, showing the bait chamber or compartment open.

Referring now to the drawings in detail, it will be seen that the embodiment of the invention which has been illustrated comprises an elongated tunnel or inclosure which is designated generally by reference numeral 1, said inclosure being of any suitable dimensions and material. The inclosure 1 includes a pair of spaced, parallel sides 2, the end portions of which are rigidly secured on cross members 3 and 4. Mounted between the upper portions of the sides 2 is a comparatively short top 5. A brace 6 extends between the upper portions of the sides 2 at the front end of the inclosure 1, which is open. The rear end wall 7 of the inclosure 1 has formed in its lower portion a light transmitting opening or window 8.

Pivotally mounted at an intermediate point, as at 9, between the lower portions of the sides 2 and adapted for swinging movement in a vertical plane is an animal-actuated tiltable platform 10 which constitutes the bottom or floor of the inclosure 1. It will be observed that the pivot 9 of the platform 10 is closer to the front end of said platform than to the rear end thereof. A counterweight 11 is pivotally suspended from the front end portion of the tiltable platform 10 for resetting same. When in set or horizontal position, the front end portion of the tiltable platform 10 rests on the cross member 3 which constitutes a positive stop for said platform. A slot 12 extends longitudinally into the platform 10 from the front end thereof, which slot accommodates the pivoted end 13 of the rod 14 to the lower end of which the weight 11 is fixed. The rod 14 is operable in a notch or cut-out 15 which is provided therefor in the cross member 3.

Fixed on the front end portion of the platform 10 and rising therefrom is a closure 16 for the front end of the inclosure 1, said closure 16 having an entrance 17 in its lower portion. Suspended, as at 18, between the upper portions of the sides 2, adjacent the front end of the top 5, for swinging movement in a vertical plane between said sides is a gate 19. A rod 20 connects the gate 19 to the closure 16 for actuation by the platform 10. A slot 21 in the gate 19 accommodates one end portion of the rod 20. A slot 22 is provided in the upper portion of the closure 16 for the other end portion of the rod 20.

In the rear end portion of the inclosure 1, the sides 2 thereof are provided with vertical grooves 23. The grooves 23 slidably receive a transparent partition 24. A horizontal partition 25 is provided between the vertical partition 24 and the end wall 7, above the opening or window 8, thus providing a chamber or compartment 26 for the reception of suitable bait, as at 27. A closure 28 is provided for the bait compartment or chamber 26, said closure being pivotally secured for swinging movement in a vertical plane between the upper portions of the sides 2, adjacent the rear end of the top 5, as at 29.

It is thought that the operation of the trap will be readily apparent from a consideration of the foregoing. Briefly, the inclosure 1 is placed in position on an open top receptacle 30 which is filled to the desired level with water. A ramp or ladder 31 is provided at the front end of the inclosure 1. The animal, attracted by the bait 27, ascends the ramp 31 and enters the inclosure 1 at the open front end thereof, said animal mounting the platform 10 through the entrance 17. When the animal, passing the pivot 9, has moved a sufficient distance toward the rear end of the trap, the platform can, under the weight of the animal, swing downwardly to substantially the position suggested in broken lines in Figure 4 of the drawings for depositing said animal in the water in the receptacle 30. When this occurs, the gate 19 swings downwardly and closes the entrance 17. After the animal has been dropped into the water, the counterweight 11 returns the platform 10 to its former position and the trap is ready for the next operation, the rod 20 swinging the gate 19 upwardly to inoperative position.

It is believed that the many advantages of an animal trap constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. An animal trap of the character described comprising an elongated inclosure open at its front end, said inclosure including a rear end opaque wall having a lower window therein, a vertical transparent partition in the inclosure adjacent the end wall but spaced therefrom, a horizontal partition between the transparent partition and the end wall and above the window, the partitions and said end wall providing an elevated chamber in the enclosure for the reception of bait, a closure for the chamber pivotally mounted in the upper portion of the inclosure for swinging movement in a vertical plane, and a tiltable animal-operated platform pivotally mounted in the lower portion of the inclosure.

2. An animal trap comprising an elongated inclosure having an open front end and provided with a top having an aperture therein at the front end of the inclosure, a tiltable platform forming the bottom of the inclosure and pivotally mounted in the inclosure for tilting by the weight of an animal thereon passing rearwardly beyond the pivot thereof, a closure for the front end of the inclosure fixed on the platform and movable upwardly thereby through said aperture during tilting of said platform, said closure having an entrance therein, a gate normally closing said aperture and pivoted therein to swing downwardly and rearwardly of the inclosure into substantially vertical position when the platform is fully tilted, and a rod pivoted at one end to the upper part of the closure and having its other end pivoted to said gate whereby tilting of the platform swings the gate downwardly and rearwardly, said rod normally lying in the plane of the gate when the latter is closed and said closure and gate being slotted to accommodate said rod therein whereby the rod is normally arranged in an out-of the way protected position at the top of the inclosure.

GORDON H. MIDDLETON.